350-331 SR
XR 3,982,239 3103E

United States
Sherr

3,982,239
Sept. 21, 1976

[54] SATURATION DRIVE ARRANGEMENTS FOR OPTICALLY BISTABLE DISPLAYS

[75] Inventor: Solomon Sherr, Hartsdale, N.Y.

[73] Assignee: North Hills Electronics, Inc., Glen Cove, N.Y.

[22] Filed: July 22, 1974

[21] Appl. No.: 490,556

Related U.S. Application Data

[63] Continuation-in-part of Ser. No. 330,227, Feb. 7, 1973, Pat. No. 3,848,247.

[52] U.S. Cl. .................... 340/324 M; 340/166 EL; 340/336; 350/160 LC

[51] Int. Cl.² .................................... G06F 3/14

[58] Field of Search .......... 340/324 R, 324 M, 336, 340/166 EL; 350/160 LC

[56] References Cited

UNITED STATES PATENTS

| | | | |
|---|---|---|---|
| 3,525,091 | 8/1970 | Lally | 340/324 R |
| 3,532,813 | 10/1970 | Lechner | 350/160 LC |
| 3,540,209 | 11/1970 | Zatsky | 340/324 R |
| 3,614,200 | 10/1971 | Taylor | 340/324 R |
| 3,653,745 | 4/1972 | Mao | 340/324 M |
| 3,743,773 | 7/1973 | Sobel | 340/166 EL |

OTHER PUBLICATIONS

Ferroelectric Ceramic Light Gates Operated in a Voltage–Controlled Mode, Maldonado et al; IEEE Trans, vol. ED–17, No. 2; Feb. 1970 pp. 148–157.

Liquid Crystal Polychromatic Display Device, Freiser vol. 15, No. 2, IBM Tech. Discl. Bull.; July 1972 pp. 700–701.

*Primary Examiner*—Marshall M. Curtis
*Attorney, Agent, or Firm*—Eisenman, Allsopp & Strack

[57] ABSTRACT

An addressed display system using material, such as liquid crystal, light emitting diodes, ferroelectrics, fluid flow devices, electroluminiscent materials, etc., which exhibit at least two characteristic modes of operation in accordance with the electric field applied. The materials are assembled with appropriately disposed conductors for establishing the electric field in discrete areas. These conductors are selectively addressed to effect a substantially zero potential at the discrete areas being chosen and at least a saturation potential across all other areas. The display embodiments include matrices, alphanumerics, and a chronometer.

19 Claims, 13 Drawing Figures

3982239
OR IN 340/324M

TYPICAL TOP PLATE

TYPICAL BOTTOM PLATE

SATURATION DRIVE ARRANGEMENTS FOR OPTICALLY BISTABLE DISPLAYS

CROSS-REFERENCE TO RELATED APPLICATION

This is a continuation-in-part of applicant's co-pending application Ser. No. 330,227, filed Feb. 7, 1973, now U.S. Pat. No. 3,848,247.

BACKGROUND OF THE INVENTION

1. Field of the Invention

This invention relates to display assemblies and more particularly to structures and addressing techniques for display assemblies using liquid crystals and the like.

2. Description of the Prior Art

The use of electroluminescent panels as display media is well developed. More recently, light emitting diodes, liquid crystals and plasma panels have been used for the presentation of matrix type displays. In general, a large number of input electrodes and switching positions are used in the prior art in order to address discrete points and achieve reasonably high resolution. A common method of implementing activation of selected elements within a matrix, for example, includes the use of orthogonal grid leads to form the matrix and separate switching controls for applying a potential to each grid lead. Using such an arrangement, a unit of 256 elements or cross points would be arranged in a matrix of 16 × 16 and 32 switching or driving elements would be required. For a 1024 × 1024 array of 1,048,576 discrete points, as many as 2,048 leads and drivers are required, in addition to the necessary selection circuitry.

Various attempts have been made to reduce the number of leads and active drivers required to achieve a particular degree of resolution. Two approaches of particular interest are an electron beam display and a digitally addressed solid state electroluminescent device. In each of these systems, an approach to a theoretical minimum of active elements has been indicated. In the first instance an evacuated envelope, a complicated cathode assembly, and a multitude of apertured multiplier plates are required. In the second instance, a special photo conductor pattern is required which is difficult to construct and select. Still other attempts to circumvent the need for a multiplicity of leads, employ glow transfer mechanisms and schemes devised for plasma panels.

The term matrix may be more generally applied to cover the definition of cross points or areas by means of intersecting or physically proximate conductors which can be individually stimulated to establish a discrete condition at any selected area. Thus, the field of interest includes digital clocks and data display panels using active elements such as liquid crystals, gas, plasma, light emitting diodes, and ferroelectric materials. A common assembly of elements includes a layered panel, or panels, having configured conductors on opposing faces or connected to specially configured active elements. The conductors are selectively energized to modify the characteristics of the active elements and thereby create the desired display.

SUMMARY OF THE INVENTION

The display assemblies and addressing systems of the present invention are based on novel addressing and driving techniques using a unique combination of coupling and addressing modalities. The resulting devices do not increase the complexity of the final unit nor do they increase the number of coupling elements to a point at which the cost is excessive as compared to the reduction in the addressing and driving electronics.

An object of the present invention is to produce an improved addressing system for a visual display using a minimum of drive and selection inputs.

Another object of the invention is to provide an addressing system for a visual display which is both economical and practical to fabricate.

Another object of the present invention is to provide an improved addressed display system utilizing a minimum of components for selectively activating layered display media.

Another object of the invention is to provide an improved chronometric display and means for the energization thereof.

An important feature of the invention lies in the use of saturation drive in connection with the stimulation of liquid crystal and similar materials. It is well known that some materials change their characteristics when subjected to electric fields. Nematic liquid crystals, for example, will switch from a quiescent light transmissive state to a light scattering state if one applies a relatively low voltage thereacross. To employ these materials in displays or even storage media, one must assure reliability of switching and non-interference between adjacent but discrete units. This is of particular importance in tightly-packed matrix configurations or chronometric displays of the type contemplated.

In addition to the dynamic light scattering effect utilized herein to describe particular embodiments of the invention, other electro-optic field effects of liquid crystals may be employed. Thus, polarizers or dichroic dyes may be used to produce desired visual changes in response to appropriate electrical stimulation.

One approach of the present invention lies in the discrete selection of matrix cross points by means of a zero voltage condition. Since the matrices of interest are constructed of materials whose characteristics change in response to particular voltage or field conditions, one is able to change the characteristics of all but desired discrete portion of an entire unit by applying the particular required voltage to all but said desired discrete portion; the desired portion being held in its quiescent or zero voltage condition. This is in contrast to conventional selection techniques wherein only the desired portion would have the particular required voltage applied. By using this method of selection, unwanted cross-talk between adjacent areas is eliminated, and a great reduction in control circuitry can be effected.

Another aspect of the present invention lies in the development of instrument displays using the above-mentioned materials. Specific embodiments employ light scattering nematic liquid crystal material in panel assemblies with selectively configured conductors on opposing faces. The conductors are selectively driven by a minimum of leads which are stimulated to saturation drive all portions of the unit except those being used to indicate the present time of day. The inventive principles illustrated are believed to be applicable with other liquid crystal field effects and also with other active elements such as ferroelectrics and light emitting diodes.

The various aspects of the invention are illustrated in several embodiments. In a first embodiment, a multi-layer light transmissive liquid crystal panel assembly is used. Selection of an area or cross point in a matrix or other configuration is effected by placing all other cross points in a light scattering mode while leaving the selected cross point in the light transmissive mode. In this embodiment, the cross point selection might be considered to be passively transmitted to the second layer, in that the selection off an area or cross points in each layer results in the creation of a selected window or path for the unhampered transmission of light or similar energy. It will be apparent that one may also employ liquid crystal material exhibiting light blocking or other field effects.

In another embodiment of the invention, a single layer liquid crystal panel is employed to create the unique visual information display of a chronometer. For description purposes, a quiescent light blocking liquid crystal structure is used. The plates on each side of the liquid crystal material serve as the mounting substrate for selectively configured and connected conductors. The conductors are driven, with the exception of those defining the time, into saturation in order to render the major portion of the unit light transmissive. The conductors defining the time indicating elements are held substantially at zero potential to leave these elements in a light blocking mode. This type of unit offers almost unlimited design capability and provides an extremely attractive and ornamental presentation of the time of day.

In general the invention relates to liquid crystal assemblies comprising liquid crystal material sandwiched between selectively positioned transparent conductors. The assemblies are operative to modify the light transmission characteristics of the liquid crystal material between energized conductors when the voltage between the conductors exceeds a predetermined value, and include means for selectively applying a voltage of one polarity and at least said predetermined value to the conductors on one side of the liquid crystal material, and means for selectively applying a voltage of opposite polarity and at least said predetermined value to the conductors on the other side of the liquid crystal material. The conductors defining the point or area to be selected in opposing positions on each side of said liquid crystal material are returned to a common potential, such as ground, to prevent modification of the light transmissive characteristics of the liquid crystal material therebetween. One may achieve the required voltage difference or field, by using either direct voltage of appropriate magnitude and polarity, or properly phase related alternating voltages.

A complete understanding and appreciation of the invention will be available from the following discussion which is made in conjunction with the drawings.

DESCRIPTION OF A PREFERRED EMBODIMENT

Figure 1:
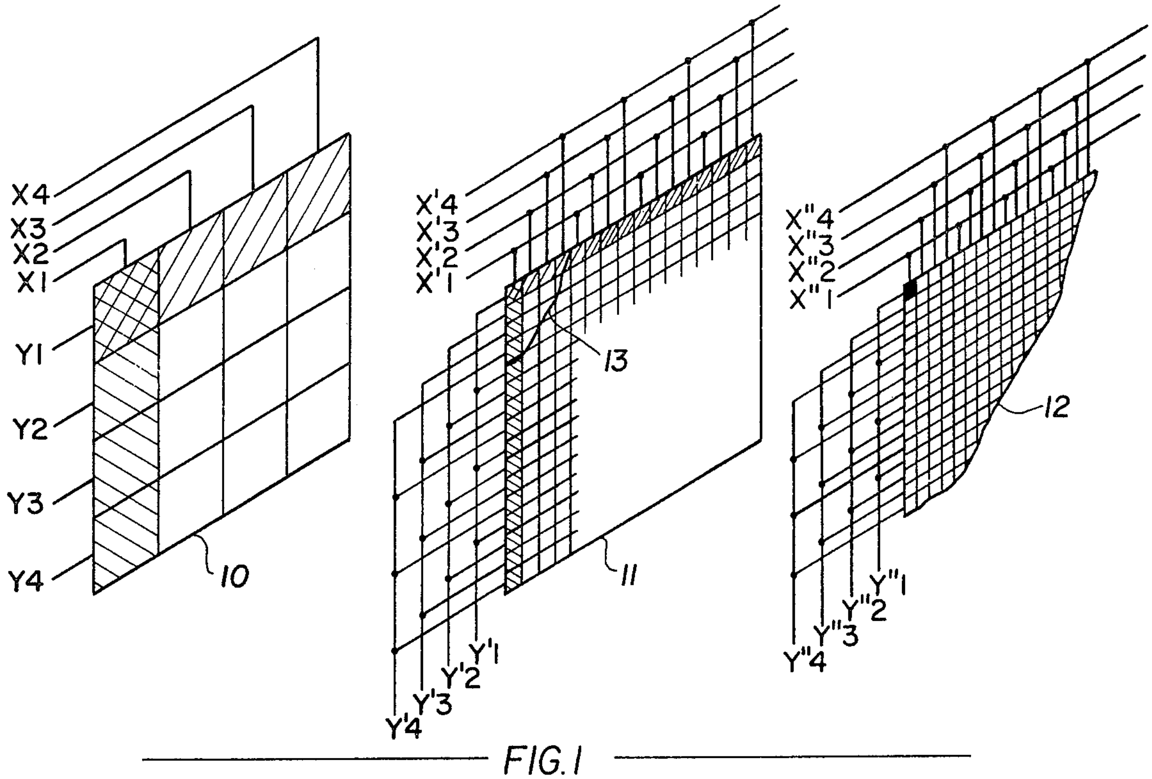
FIG. 1 is a schematic illustration useful in understanding some of the principles of operation of the invention.

FIG. 1 illustrates three planar levels 10, 11, and 12 of a device wherein each level comprises an array of areas or segments arranged in rows and columns, each row or column being selectable by the electrical energization of column and row leads X and Y. The third level is represented by a greatly enlarged portion corresponding to the upper left portion of level 11 as defined by the heavy line 13.

With the three level arrangement of FIG. 1, one may select any one of 4,096 points by energization of only 24 leads. In other words, one need supply only the necessary logic circuitry and drivers for 24 leads as compared to the more conventional need for 128 leads for driving a matrix unit of this capacity. It is essential, of course, that the points of each level be coupled in such a manner that adjacent sections of succeeding layers are enabled in accordance with whether or not the preceding section has been selected. The operation of typical elements capable of being employed in this type of matrix is such that energization need not be exactly coincident in order to achieve appropriate operation; however, there must obviously be an overlap of enablement.

The base level 10 is divided into 16 discrete areas arranged in four columns and four rows. For purposes of discussion the interconnected leads have been labeled X1 through X4 in order to denote column leads disposed along an X-axis, and Y1 through Y4 in order to denote row leads disposed along a Y-axis. In accordance with the zero selection principle of the invention, the elements in this level are selected by coincident stimulation of all intersecting X and Y leads, except those containing the desired element.

The intermediate level 11 is also divided into a plurality of areas arranged in rows and columns; however, the resolution of this level is considerably greater than that of the base level. Level 11 has been sub-divided by a multiple of 4 greater in both axes than the base. Accordingly, within the area denoted by selection X1-Y1 in level 10, there are 16 areas in level 11. The rows and columns in level 11 are connected to four X-axis leads X'1 through X'4 and four Y-axis leads Y'1 through Y'4. Each lead is connected to every fourth row or column respectively.

If it is assumed that all leads but X1-Y1 and X'1 and Y'1 have been energized, the double cross-hatched area in the upper left corner of level 2 will have been selected. This selection by means of discrete de-energization, or non-energization of four leads only, has effected a selection with a resolution of 1 in 256.

The third level 12, depicted by a greatly enlarged segment, shows representative leads interconnected in a manner similar to that previously described. Lead designations have been made in accordance with the same terminology as before, but using double-prime notations, i.e. X''4 through X''4 and Y''1 through Y''4. The resolution of this third level is four times that of the preceding level in both axes. In order to select the upper left hand element in this level, it is necessary to energize all leads but X1, Y1, X'1, Y'1, X''1, Y''1. One has then effected a selection with a resolution of 1 in 4,096 by the discrete de-energization, or non-energization, of six leads only.

Figure 2:
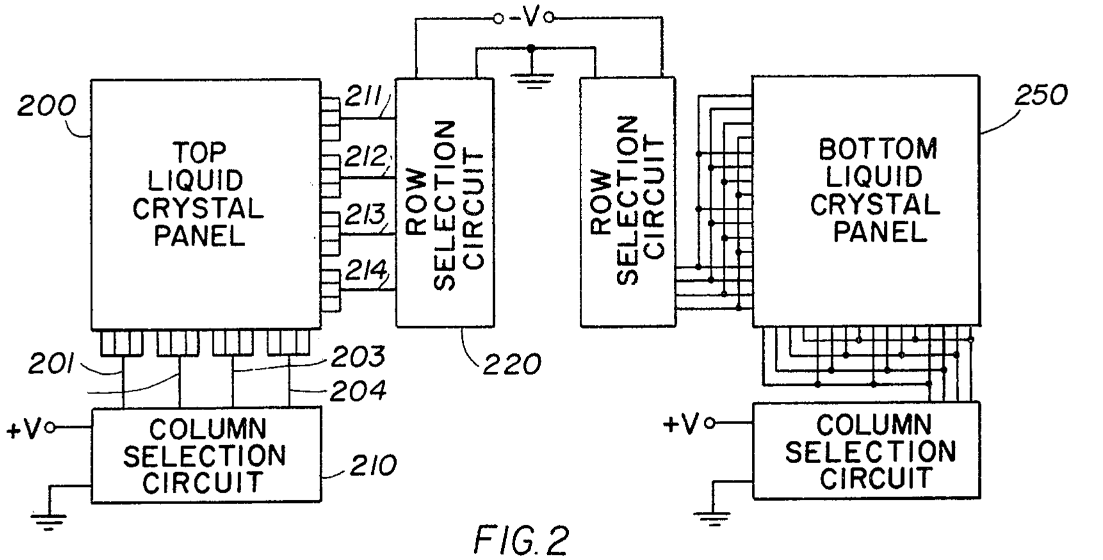
FIG. 2 is a schematic illustration of a two layer embodiment of the invention using liquid crystal material.

FIG. 2 illustrates a two layer liquid crystal embodiment of the invention. Two criteria essential for this embodiment are that it be capable of being used in a matrix addressed assembly and that a plurality of layers may be arranged in tandem without excessively reducing the contrast ratio between transmissive and scattering portions of the unit. Selection of the intersecting conductors in such a system renders the selected cross point area light scattering, light blocking, or light transmissive, depending on the type of liquid crystal optical effect employed.

In accordance with the saturation drive, or zero potential selection, principle of the invention, all rows and columns in the top layer, with the exception of the ones containing the desired information cross point, are energized and therefore drive the proximate material into the scattering or light blocking condition. The bottom layer is similarly energized so that only the row and column containing the desired information cross point are not activated and remain transmissive. The transmissive state exists at the intersection of all of the non-energized rows and columns in the bottom layer, but only the intersection of the one desired row and column of the bottom layer will be under the transmissive area in the top layer. As a result, only one segment of the assembly will be fully transmissive, with all others having either one or two scattering or light blocking layers.

FIG. 2 presents a top panel 200 and bottom panel 250, side by side. Actually, these panels are assembled with their surfaces in proximity. For purposes of illustration, the top panel is arranged with four columns 201, 202, 203, 204 and four rows 211, 212, 213 and 214. Physically, each column and row in the top layer is defined by four undesignated conductors on the upper or lower face of the panel respectively, which are connected to a single conductor, e.g. 201 and traverse the entire surface. Leads associated with each column and row are actuated by a Selection Circuit 210, 220 respectively. Bottom panel 250 is similarly arranged; however, the intersecting conductors are individually energized and are connected to the Selection Circuits to effect the higher resolution discussed above in connection with FIG. 1.

The Selection Circuits are designed to energize all leads except those connected to the column or row to be selected. Column Selection Circuit 210 applies a direct voltage (+)V to the leads and Row Selection Circuit 220 applies a direct voltage (−)V to the leads, where V is at least the voltage magnitude required to place the liquid crystal material in its light scattering mode. Since the switching voltage of the liquid crystal material is not always the same, magnitude V is selected to assure saturation. As a result, all areas of panel 200, with the exception of the desired cross point, will have a voltage of magnitude V or 2V applied across the liquid crystal material. The desired cross point will have both leads grounded so that only the area at the desired cross point will be light transmissive.

The driving and selection technique just described, which operates on the saturation voltage, rather than the break-point voltage, may be used with field effect units wherein the analyzer-polarizer combination is arranged to cause light transmission in the non-activated mode. This type of unit is quite insensitive to voltage variations and consequently cross talk is minimal. Normal break point X-Y addressing may also be used when the analyzer-polarizer combination is arranged to effect light blocking in the non-activated mode.

For ease of description, the system has been disclosed in conjunction with a square array of row and column arrangement of elements and conductors; however the system of the invention is not limited to such a configuration of electrodes and elements.

Figure 3:
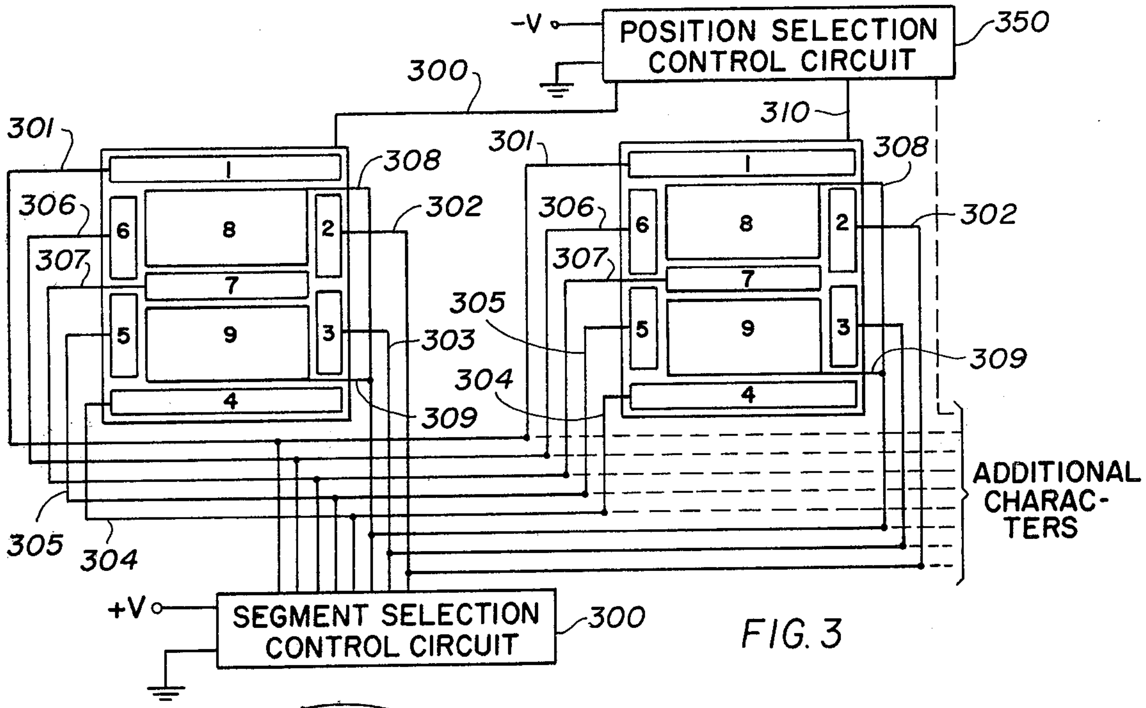
FIG. 3 is a schematic illustration of a second embodiment of the invention wherein the principles of the invention are applied in a multiplexed assembly to develop a display of alphanumeric characters.

FIG. 3 illustrates use of the saturation voltage technique for multiplexing a group of segmented alphanumeric characters. The individual character segments, numbered 1 through 9, are connected by leads 301–309 to a Segment Selection Control Circuit 300, which is operative to energize selected segments with a voltage (+)V and to connect all other segments to ground. In the FIGURE, two character positions are illustrated, but of course, others may be similarly connected. The common conductors for the character positions are connected by leads 300, 310 to a Position Selection Control Circuit 350, which is operative to return the conductor in the selected position to the ground, while all other common electrodes are returned to (−)V.

All areas are arranged to be energized except the selected segments in the selected position. The desired character will be viewable in that position only. Since all equivalent segments in each position are connected in parallel, the multiplexing may be achieved with only one lead per character segment plus one lead per character position. In the illustrated embodiment, segments are also provided for the "open" spaces 8, 9 in a character. Thus, nine conductive leads are required for one position, 10 conductive leads for two positions, etc.

With the described energization technique, and using normally transmissive liquid crystal structure, a selected character, e.g. "2" in the first position, is generated by grounding leads 301, 302, 307, 305, 304 and 300. All other leads are energized with a voltage of either (+)V or (−)V.

Figure 4:
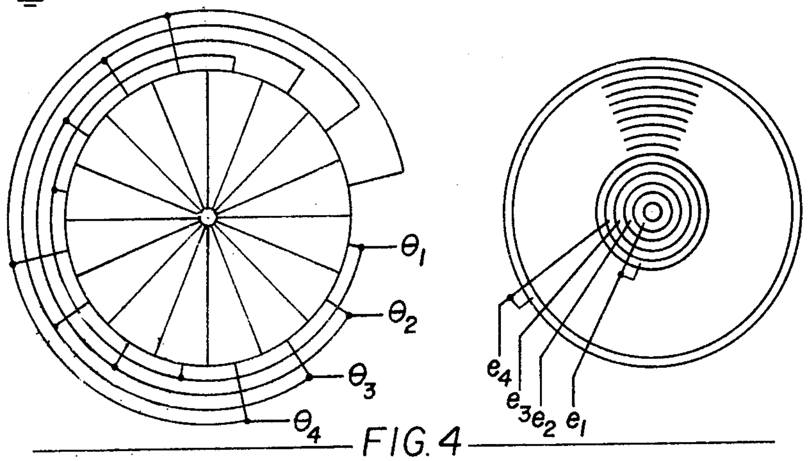
FIG. 4 is a schematic illustration of a third embodiment of the invention wherein a single layer assembly is arranged in accordance with a polar coordinate system.

FIG. 4 illustrates the use of these techniques in a polar coordinate display of the range-azimuth type. A typical layer is divided up into angular sectors $\theta_1$, $\theta_2$, $\theta_3$, $\theta_4$, and circumferential rings $e_1$, $e_2$, $e_3$, $e_4$. Several layers of differing resolution may be used, if desired, for greater resolution. Such an assembly may be driven by saturation energizing all rings and sectors except those in which the desired area falls. This leaves the desired area, light transmissive.

Yet another polar-type utilization of the invention is disclosed in FIGS. 5 through 9. These figures show a typical clock effective to indicate hours, minutes, and seconds throughout a 12 hour cycle. The clock assembly may be operated in response to a relatively simple one hertz pulse train and lends itself to extremely decorative display forms.

Figure 6A:
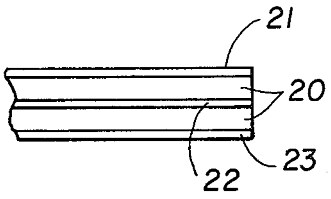
FIGS. 6A, 6B, and 6C diagrammatically illustrate panel assemblies suitable for practicing the invention.
Figure 5:
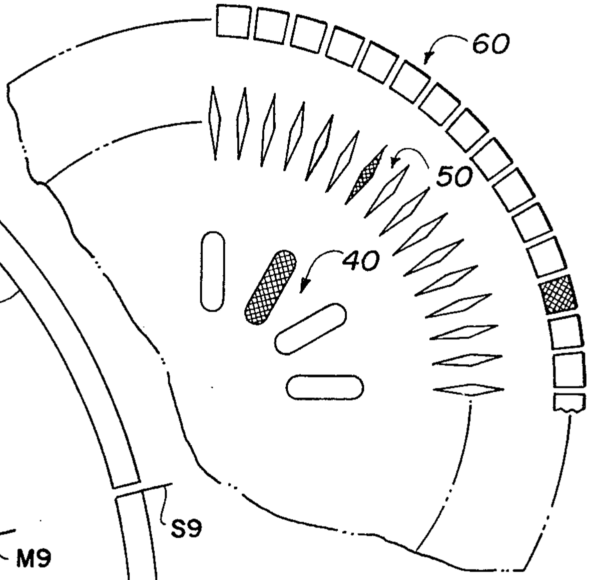
FIG. 5 is a pictorial illustration of a fourth embodiment of the invention wherein a single layer assembly is used to produce a liquid crystal clock.

The particular assembly used to produce the display of FIG. 5, can take a variety of forms. FIG. 6A illustrates a diagramatic side view of one multi-layer form, wherein liquid crystal material 20 is sandwiched between plates 21, 22, and 23. The plates 21, 22, and 23 are used in conventional fashion to retain the liquid crystal material and serve as mounting substrates for the conductors that are selectively energized to create the desired light transmission effects. The conductors are selectively connected and energized in accordance with the invention to depict desired display material. A light source or sources will be provided either behind, or in front of, the assembly, depending upon the particular type of liquid crystal material used.

Figure 6B:
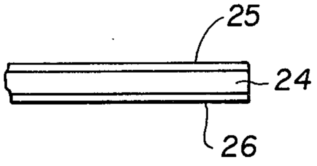
Figure 6C:
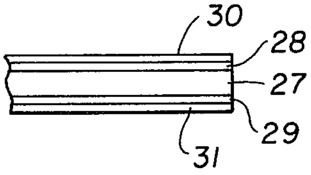

Single layer assemblies are illustrated in FIGS. 6B and 6C. In FIG. 6B, liquid crystal material 24 is sandwiched between plates 25, 26. In FIG. 6C, crossed polarizers 30, 31 are included with a sandwich assembly of liquid crystal material 27 and plates 28, 29. Using the polarizers, one is able to employ the other known field effects of liquid crystal material, which at times yield better results than the dynamic scattering characteristic.

The clock display of FIG. 5, is presented as an example of instrument displays made practical and economical by the invention. This figure depicts a clock face on a single layer liquid crystal assembly. Three circumferentially disposed sets of elements 40, 50, 60 are used to register hours, minutes and seconds respectively. Each element is defined by conductors on the top and bottom conductor plates of the assembly, as shown more fully in FIGS. 7A and 7B. The element conductors are formed as a transparent coating upon rigid plates of glass or the like. The area between the elements is rendered opaque by suitable coating.

The clock face of FIG. 5 depicts a time of 6 minutes and 13 seconds after 1 o'clock. In a particular embodiment that has been constructed, the present time is created by illumination of all elements except those representative of the time being depicted. Thus, FIG. 5 shows the appropriate elements in black. There is no limitation on the shape of the elements, other than that imposed by etching and lead connection restrictions. Accordingly, one is free to develop a relatively unlimited display presentation. The lead interconnection and energization techniques of the invention enhance this freedom still more. FIG. 5 suggests the use of a liquid crystal material that is quiescently opaque and becomes light transmissive when subjected to an electric field. By using a field effect liquid crystal assembly, with polarizer-analyzer combinations, one may also produce a display wherein the indicia elements are light blocking in the non-energized state.

Figure 7A:
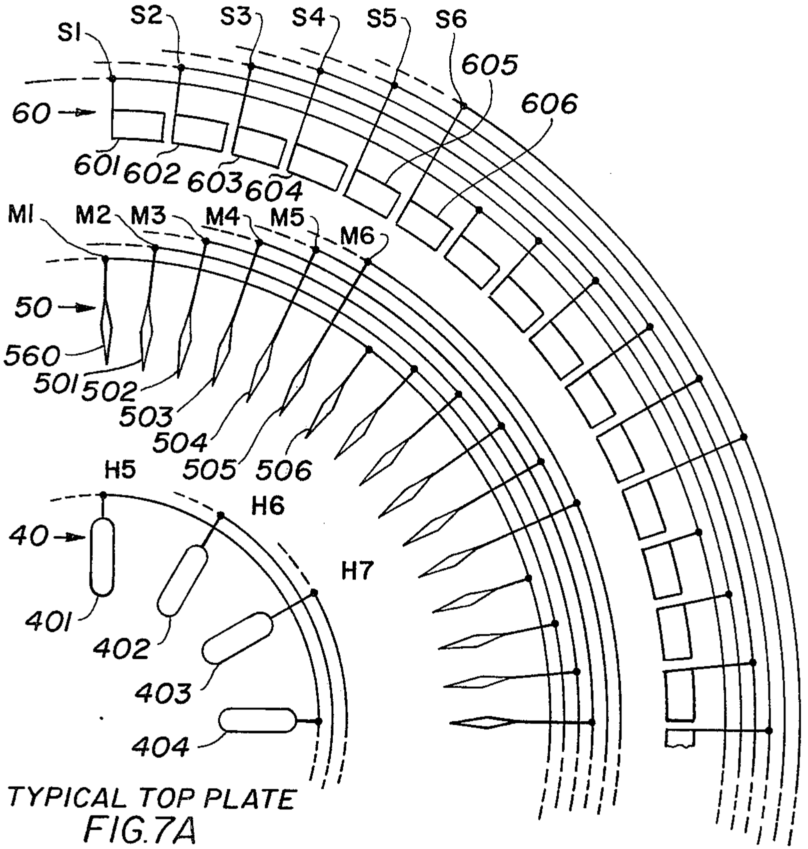
FIGS. 7A and 7B illustrate portions of typical conductor patterns on top and bottom plates, respectively, of an assembly for producing the embodiment of FIG. 5.
Figure 7B:
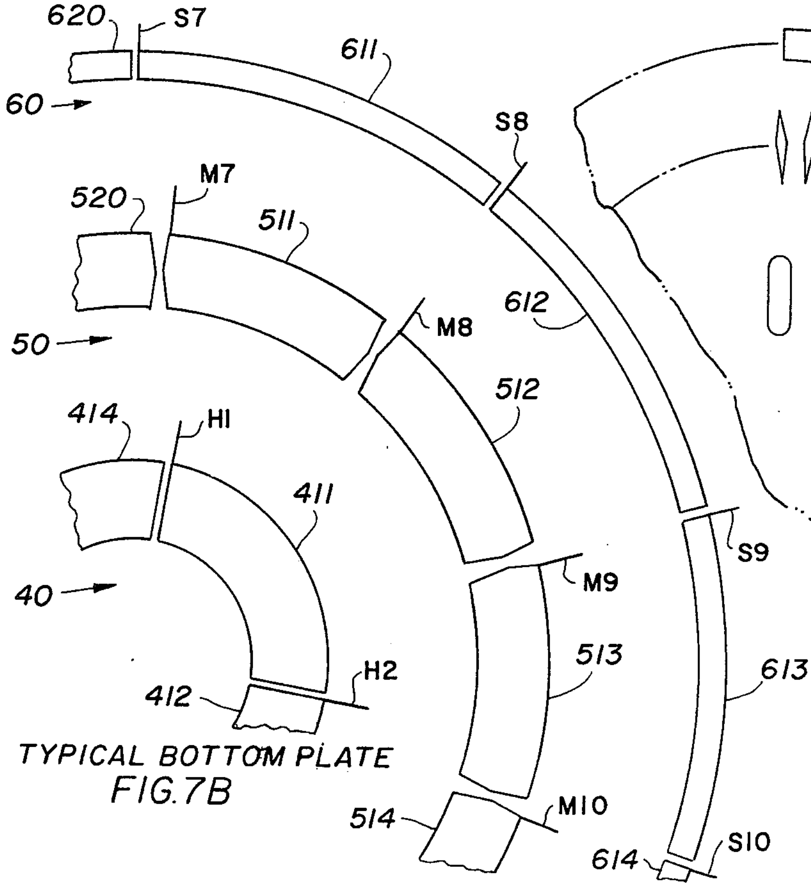

FIGS. 7A and 7B illustrate the conductor configurations on typical top and bottom plates of the clock display assembly of FIG. 5. These figures also show a preferred lead connection to effect electrical stimulation with a minimum of drive and control circuitry. Only slightly more than a quadrature portion of the plates is illustrated. The remaining portion of each plate is similarly constructed and connected.

The segments shown in the figures represent conductive portions. The leads show how these segments are connected. Those skilled in the art will recognize that actual fabrication of each plate may conveniently be effected by the conductive plating of an entire surface followed by selective etching of the spaces between conductors and leads. Thus, FIGS. 7A and 7B are diagrammatic only, and are not necessarily intended to show actual plated surfaces.

The elements or segments are connected to a plurality of leads bearing both alphabetic and numeric designations. These designations indicate that each lead controls either the hours elements "H", the minutes elements "M", or the seconds elements "S". One may connect the leads and the conductor segments for the minutes and seconds indicators identically, or differently. The specific embodiment shown in FIGS. 7A and 7B uses a similar configuration of conductors for both the minutes and seconds ring. Where space is at a premium, it may be desirable to provide a multi-layer arrangement with the minutes and seconds elements defined by conductor segments on several layers.

The top plate of the hours indicating ring 40, contains twelve conductor sgments 401–411 arranged in groups of three (only 401–404 are shown), with each three segments lying within a quadrant. Corresponding segments within each quadrant are connected to a single control lead. Thus, the first segment 401, 404, etc. in each quadrant is connected to lead H5; the second conductor segment 402, etc. in each quadrant is connected to lead H6, and the last conductor segment 403 etc in each quadrant is connected to lead H7.

The bottom layer of conductor segments in the hours ring 40 contains four conductor segments 411–414 (only 411, 412, 414 are shown) only. Each of these segments encompasses an entire quadrant and consequently cooperates with the three smaller segments on the opposing top plate. In this case, each conductor segment is connected to a single lead. These leads are designated in a clockwise direction, as H1, H2, H3, and H4 (only H1 and H2 are shown).

One may stimulate hours positions by energizing either the bottom conductor or top conductor of the hour ring with a voltage equivalent to the saturation voltage of the liquid crystal material. In keeping with the invention, for example, to develop a transmissive "window" in order to designate the first hour, one energizes leads H2, H3, H4, H5, and H7. Under these conditions, all segments except the one connected to H6 in the first quadrant will be illuminated. The opposite effect may be obtained by using light blocking liquid crystal material.

Similar consideration may be given to the conductor segments distributed about the minutes ring 50. The top layer of the minutes ring is made up of 60 segments 501–560 (only 16 are shown), arranged in groups of six with the corresponding segment in each group connected to the same control lead. Accordingly, there are six output leads, M1, M2, M3, M4, M5 and M6.

The bottom conductor layer of minute ring 50 is divided up into ten conductive segments 511–520 (only five segments are shown). These segments are individually connected to a separate control lead, M7 through M16 (only M7–M10 are shown). As described above, the leads M1 through M6 may either be energized by a saturation voltage, or grounded. To produce the desired window, one energizes the segments coupled to all but the desired segment. For example, to designate the sixth minute as illustrated in FIG. 5, one energizes all of the leads with the exception of leads M1 and M8. A particular circuit for effecting this type of energization is set forth in FIG. 8.

The conductor layout for the seconds ring 60 may be substantially identical to that for minutes ring 50. As noted above, one may vary the specific configuration of conductors in accordance with design desires and availability of actual area. Obviously, the smaller the display surface, the more one must be concerned with utilization of conductors and their positioning.

Figure 8:
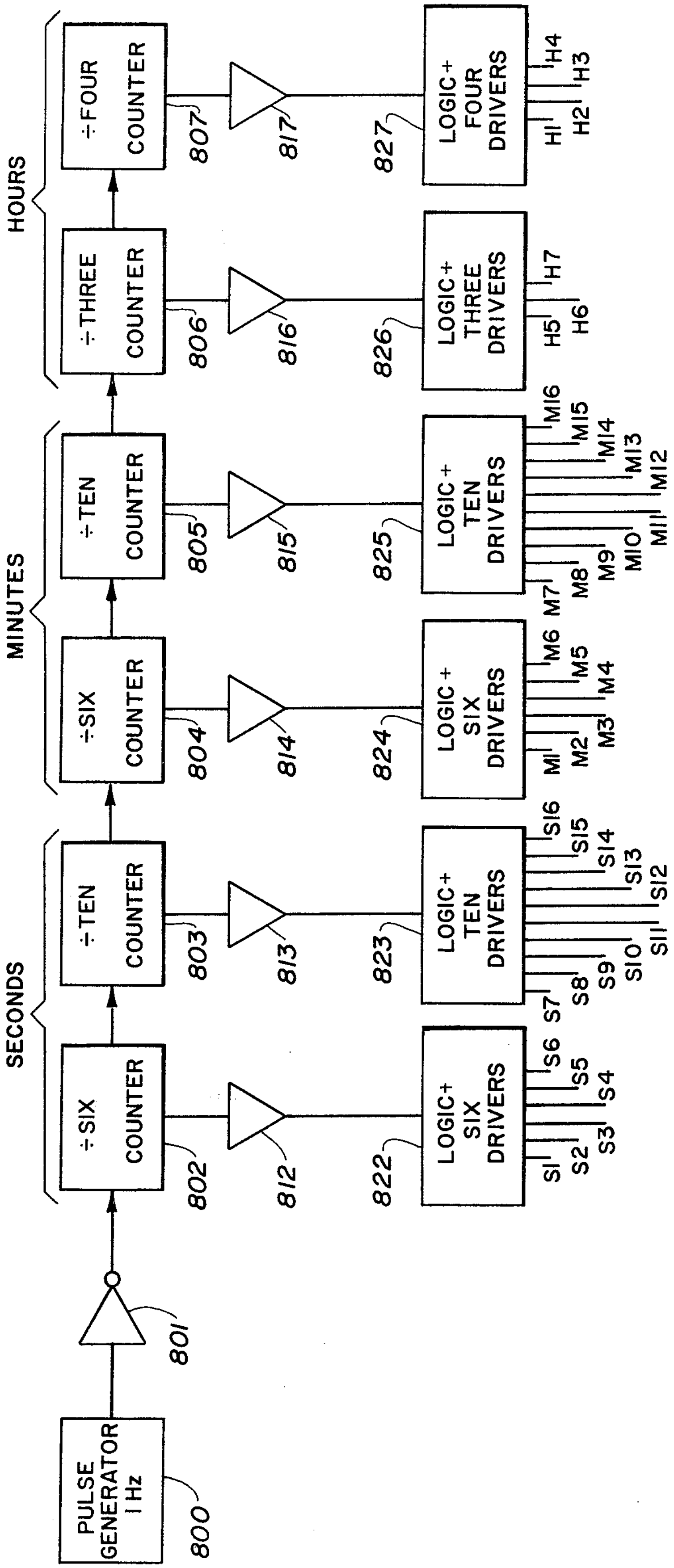
FIG. 8 is a block diagram circuit schematic of the control circuitry for energization of the fourth embodiment illustrated in FIGS. 5 and 7.
Figure 9:
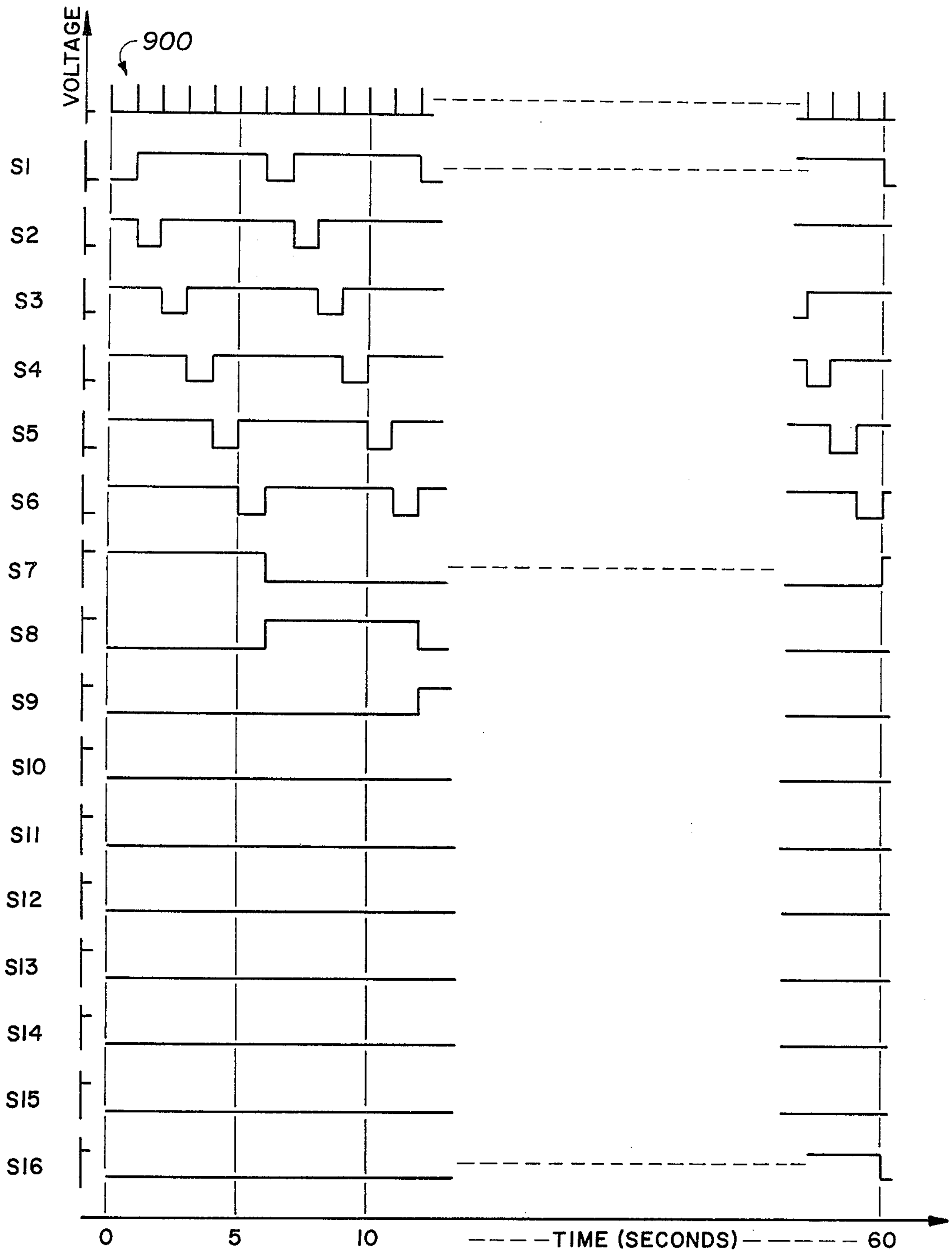
FIG. 9 shows a series of pulse waveforms which may typically appear on the seconds conductors of FIGS. 7A, 7B, wherein voltage magnitude on each conductor is plotted as a function of time.

A drive circuit for the display embodiment of FIG. 5 is shown in the block schematic of FIG. 8. This block schematic illustrates the basic circuitry employed in order to selectively drive the various control leads of the clock. FIG. 9 shows pulse voltage waveform as a function of time on control leads S1 through S16 which control the seconds ring 60.

The operation of the circuitry of FIG. 8 will be sufficiently understood by consideration of the seconds lead energization only. A basic timing element such as a pulse generator 800 operating at one Hertz, serves as the timing source. The output of the pulse generator is applied through a buffer amplifier 801 to the first of a chain of counters 802–807. The count capacity of each counter before recycling, is determined by the specific conductor configuration employed on the display assembly. The elements shown in FIG. 8 will produce the required energization for the leads in FIGS. 7A and 7B. Thus, the control leads for seconds ring 60 are driven by a divide-by-6 counter 802 and divide-by-10 counter 803. The counters may be of conventional form and may advantageously be constructed using integrated circuitry. Counter 802 produces a discrete output each second, in response to the one Hertz input from pulse generator 800. The outputs are applied via a buffer amplifier 812 to logic and drive circuitry 822 to produce the desired pattern of control voltage conditions of leads S1–S6. Here too, the magnitude of the control voltages required permits the advantageous use of integrated circuitry.

The zero selection or saturation drive principle of this invention calls for the saturation drive of all portions of the display, but the portion being selected. One form of output for effecting this type of drive is suggested in the waveforms of FIG. 9. The upper waveform 900 corresponds to the one hertz pulses applied to counter 802. The succeeding six waveforms S1–S6 correspond to the voltages produced on control leads S1–S6. Each waveform is considered to vary in magnitude between zero and (+)V, where V is the saturation voltage for the liquid crystal material being used. Thus, during the first second of time, lead S1 is grounded and leads S2–S6 are at (+)V; during the second second of time, lead S2 is grounded and leads S1, S3–S6 are at (+)V; etc.

To control selection, the bottom plate conductors must also be properly energized and this is determined by counter 803 and logic and drive circuitry 823. Upon recycling after each sixth count, counter 802 supplies a trigger pulse to counter 803. Counter 803 produces a discrete output every sixth second, which is applied via a buffer amplifier 813 to logic and drive circuitry 823. The drive circuitry 823 produces the desired pattern of control voltages on leads S7–S16 to cooperate with the voltages on leads S1–S6 and effect the proper visual time presentation. The particular voltage pattern on leads S7–S16 is shown in FIG. 9 to vary in magnitude between zero and (−)V, where V is the saturation voltage for the liquid crystal material being used. Thus, during the first 6 second interval, lead S7 is grounded and leads S8–S16 are at (−)V; during the second 6 second interval, lead S8 is grounded and leads S7, S9–S16 are at (−)V; etc.

Considering the waveforms of FIG. 9 in conjunction with the conductor configurations of FIGS. 7A and 7B reveal that the window of selected elements in the second ring 60, steps along sequentially at the one hertz rate. During the interval from 1 to 2 seconds, only the liquid crystal material between top segment 601 and bottom segment 611 is at zero potential. The liquid crystal material between top segments 602–606 and bottom segment 611 experiences a (+)V potential; the material between top segments 607, 613, 619 etc. and bottom segments 612–620 experiences a (−)V potential; and the material between all other top and bottom segments experiences a 2V potential. During the interval from 2 to 3 seconds, this pattern is repeated with the exception that the material between top segment 602 and bottom segment 611 is a zero potential, and the material between top segment 601 and bottom segment 611 is a (+)V.

It has been convenient to explain the lead connection and drive principles of the invention in terms of the selective energization of leads with direct potentials of positive and negative polarity and proper magnitude. Nematic liquid crystal material has been described as the material of choice in several illustrative embodiments; however, other materials also exhibit changes in physical characteristics responsive to changes in field and may be employed in practicing aspects of the invention.

Figure 10:
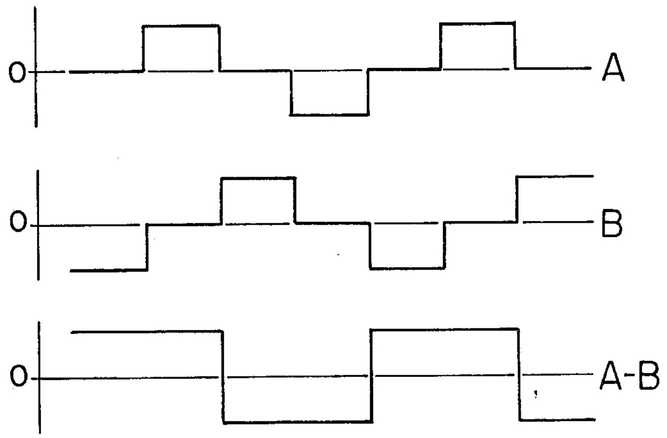
FIG. 10 shows several typical waveforms which illustrate the type of zero selection drive signals which may be employed to implement the invention.

With respect to the signals or control voltages employed, it is known that some materials are best driven with alternating potentials, rather than direct potentials. FIG. 10 illustrates typical waveforms A and B which may be used on opposing plates of the type discussed above. These waveforms are stepped from a negative value of (−)V to a positive value of (+)V. The resultant potential between the plates is represented by the third waveform A-B, which switches between (+)V and (−)V. Such a drive on the opposing plates of the embodiments described above, will provide the same opportunity for saturation drive with zero potential selection, while preventing any possibility of unwanted assembly biasing. Other forms of alternating potential drive and pulse drive will be apparent to those familiar with the art.

Although varying over a broad range of acceptability, one should consider application of the principles of this invention to such potential display materials as: light emitting diodes, ferroelectrics; fluid flow devices; electroluminescent materials; electrostatically and magnetically deflected elements; and photosensitive materials. All embodiments coming within the spirit and teaching of this disclosure are intended to be covered by the following claims.

What is claimed is:

1. A display assembly using material which exhibits at least two characteristic modes of operation in accordance with the electric field applied, the first being a quiescent state at substantially zero potential and the second being assumed in response to a voltage of at least a predetermined magnitude, comprising: the assemblage of said material in substantially planar form with spaced conductive means on opposing faces thereof to define a plurality of discrete areas, each of the conductive means on one side of said material embracing a first plurality of discrete areas, each of the conductive means on the other side of said material embracing a second plurality of said discrete areas, and each one of said second plurality of areas appearing within a different one of said first plurality of areas; and control means operative to establish a substantially zero potential between the conductive means of preselected discrete areas, to establish a potential of a first polarity and at least said predetermined magnitude on the remaining conductive means of said first plurality, and to establish a potential of the opposite polarity and at least said predetermined magnitude on the remaining conductive means of said second plurality.

2. A display assembly according to claim 1, wherein said material is liquid crystal material.

3. A display assembly according to claim 1, wherein said material is ferroelectric material.

4. A display assembly according to claim 1, wherein said material is electroluminescent material.

5. A display assembly according to claim 1, wherein alternating voltages are applied on each of said conductive means.

6. A display assembly according to claim 5, wherein the phase of said voltages on said conductive means is controlled to effect the desired polarity conditions.

7. A display assembly according to claim 1, wherein said voltages are in pulse form.

8. A display assembly according to claim 1, wherein said conductive means are circumferentially arranged on opposite sides of said material, each of the conductive means on one side of said material embraces a first plurality of adjacent discrete areas and each of the conductive means on the other side of said material embraces a second plurality of said areas, each one of said second plurality of areas appearing within a different one of said first plurality of areas.

9. A display assembly according to claim 8, wherein said control means effects establishment of said substantially zero potential across a different pair of conductive means for successive adjacent discrete portions of said material at a periodic rate.

10. A display assembly according to claim 8, wherein said material is liquid crystal material.

11. A display assembly according to claim 8, wherein said material is ferroelectric material.

12. A display assembly according to claim 8, wherein said material is electroluminescent material.

13. A display assembly according to claim 1, wherein said material is nematic liquid crystal material that is light transmissive in its quiescent state and light scattering when a potential of at least said predetermined magnitude is applied.

14. A display assembly according to claim 1, wherein said material is a liquid crystal material, and including an analyzer-polarizer combination disposed on opposite sides of said assembly.

15. A display assembly according to claim 1, wherein said material is liquid crystal material and said conductive means include transparent conductor films deposited on transparent substrates positioned on opposite sides of said material.

16. A display assembly according to claim 1, wherein said material is arranged as a planar panel of liquid crystal material provided with said conductive means on the opposing faces; the conductive means on one face substantially covering the entire surface; a first plurality of conductive means on the opposing face, each being configured and positioned to represent a segment of the alphanumeric characters in a particular font.

17. A display assembly according to claim 16, wherein alternating voltages are applied on each of said conductive means.

18. A display assembly according to claim 17, wherein the phase of said voltages on said conductive means is controlled to effect the desired polarity conditions.

19. A display assembly according to claim 16, wherein said voltages are in pulse form.

* * * * *